United States Patent
Barlow et al.

[11] 3,767,058
[45] Oct. 23, 1973

[54] MOUNTING ARRANGEMENTS
[75] Inventors: Alan Barlow; James Robert Campbell, both of Cheltenham, England
[73] Assignee: Smiths Industries Limited, Cricklewood, London, England
[22] Filed: Mar. 24, 1972
[21] Appl. No.: 237,716

[30] Foreign Application Priority Data
Mar. 26, 1971 Great Britain.................. 78,671/71

[52] U.S. Cl............................ 211/41, 339/17 LM
[51] Int. Cl............................................. A47g 19/08
[58] Field of Search ................... 211/41, 40, 89, 8; 339/17 LM, 198 GA; 317/101 DH; 206/60 R, 62 R; 85/70, 79

[56] References Cited
UNITED STATES PATENTS
| | | | |
|---|---|---|---|
| 2,075,714 | 3/1937 | Hamill | 85/70 X |
| 2,731,609 | 1/1956 | Sobel | 339/17 LM |
| 3,129,990 | 4/1964 | Rice et al. | 339/17 LM |
| 3,511,385 | 5/1970 | Ayling | 211/41 |

FOREIGN PATENTS OR APPLICATIONS
| | | | |
|---|---|---|---|
| 1,052,601 | 12/1966 | Great Britain | 85/79 |
| 633,861 | 1/1962 | Canada | 206/62 R |
| 584,085 | 10/1958 | Italy | 85/79 |

*Primary Examiner*—Ramon S. Britts
*Attorney*—William D. Hall et al.

[57] ABSTRACT

Mounting of printed-circuit boards in a compartment of a casing is made using an arrangement in which the boards are retained in guideways of two opposed compartment-walls. The guideways are defined between projecting metal blocks that are integral with the walls, and rubber bushes which extend lengthwise of the guideways and which are retained on screws in elongate recesses of the blocks, are compressed lengthwise of the guideway by tightening of the screws. The rubber bushes as so squeezed project from the recesses into the guideways and clamp the boards therein. The rubber bushes may be replaced by metal wedges that bear upon inclined shoulders of other wedge parts in this case carried by the blocks, and under compression exerted by the screws longitudinally of the guideways are similarly squeezed out into the guideways.

10 Claims, 3 Drawing Figures

PATENTED OCT 23 1973 3,767,058

3,767,058

MOUNTING ARRANGEMENTS

SUMMARY OF THE INVENTION

This invention relates to mounting arrangements.

The invention relates in particular to mounting arrangements of the kind in which a first of two members that are to be mounted one upon the other, carries two spaced parts that define by the gap between them a guideway for receiving a portion of the second member.

It is an object of the present invention to provide a mounting arrangement of this kind that is of a simple and advantageous construction.

According to the present invention there is provided a mounting arrangement wherein a first of two members that are to be mounted one upon the other, carries two spaced parts that define by the gap between them a guideway for receiving a portion of the second member, and clamping means carried by one of the two parts for exerting force transversely of the guideway to clamp the second member against the other part, comprises an element carried by the said one part and means for applying compression to said element to squeeze it to project from the said one part into the guideway and thereby exert the clamping force.

The said element may be an element of rubber or other resilient material, and the compression-applying means may then be operative to squeeze said element to project into the guideway by deformation of the element. In particular, the element may be in the form of a bush that fits into an elongate recess that extends lengthwise of the guideway, and in these circumstances compression may be applied to the bush by means of a screw that extends through the bush within, and lengthwise of, the recess to screw into the said one part.

The said element, as an alternative to being of essentially resilient material, may be of a wedge-shape, and in these circumstances the compression-applying means may include means for applying force to an inclined face of the wedge-shaped element to squeeze the element in such a way that it projects into the guideway. The wedge-shaped element may be received into an elongate recess that extends lengthwise of the guideway in the said one part, and the compression-applying means may then include a screw that extends through the wedge-shaped element within the recess to screw into the said one part.

The two parts carried by said first member, which are preferably, although not essentially, formed integrally with said first member, may be metal blocks. Furthermore, the first member may carry a series of mutually-spaced parts so as to define between successive ones of these parts a set of guideways for receiving and mounting separate members inserted therein. The invention in the latter respect, may be with advantage applied to the mounting of printed-circuit boards in a casing with a high packing density and accuracy of location.

BRIEF DESCRIPTION OF THE DRAWINGS

Two forms of mounting arrnagement in accordance with the present invention will now be described, by way of example, with reference to the accompanying drawing in which.

DESCRIPTION OF THE PREFERRED EMBODIMENTS

Figure 1:
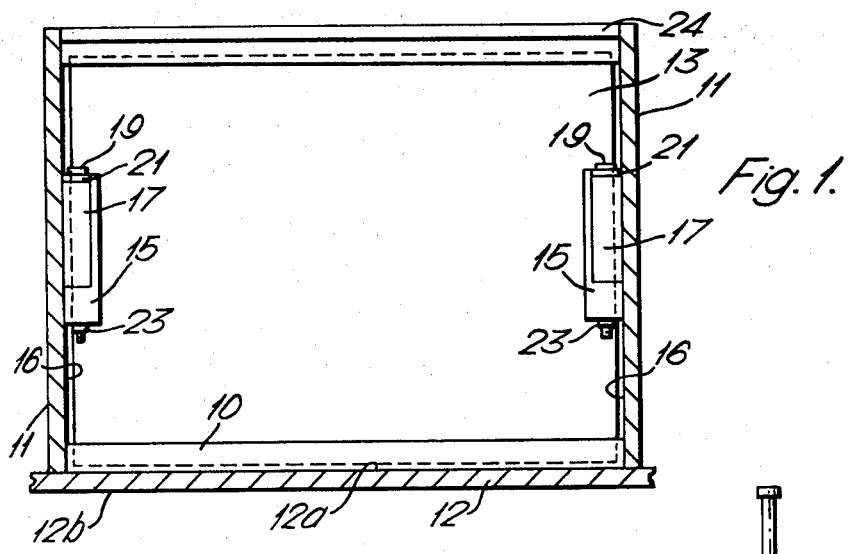
FIG. 1 is a sectional side-view of part of a casing for electrical apparatus, that includes a first of the two forms of mounting arrangement.

Both forms of mounting arrangement shown in the drawing are for use in the mounting of printed-circuit boards in a standard elongate casing of the kind which is referred to by the letters ATR (standing for Air Transport Radio) and which is commonly used in aircraft to house electronic and other electrical apparatus. With the specific equipment to be described the casing is divided along its length into a plurality of separate compartments each of which is for receiving a series of printed-circuit boards and retaining them in an upright position spaced from one another across the width of the casing.

Figure 2:
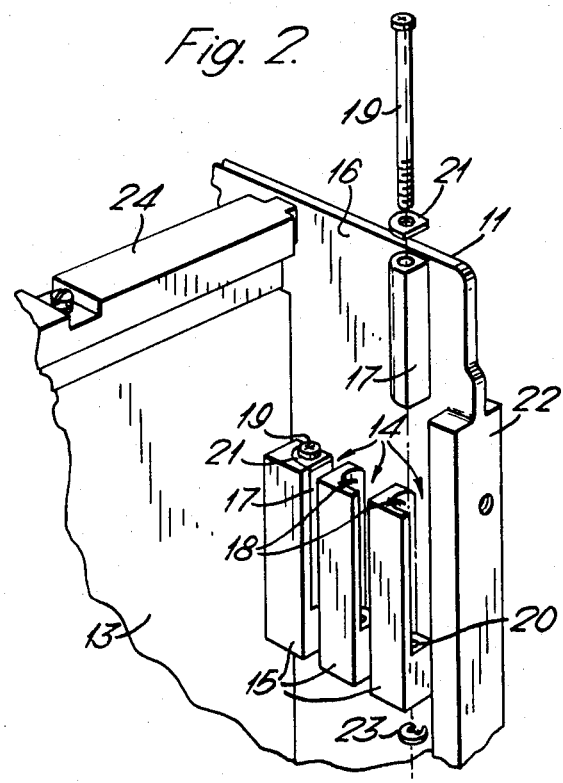
FIG. 2 is a fragmentary perspective view of the mounting arrangement of FIG. 1.

Referring to the FIGS. 1 and 2, the mounting arrangement in each compartment of the casing includes a plurality of laterally-spaced electrical connectors 10 (only one of which is shown) that are of elongate form. The connectors 10 extend lengthwise of the casing between two transversely-mounted metal dividing-walls 11, across the upper face 12a of a base plate 12. Each connector 10 is slotted along its length to receive the lower, leading end of an individual printed-circuit board 13 inserted into the compartment from the top, and includes electrical contact-fingers (not shown) for establishing electrical connection with the printed-circuit board 13 (the details of the printed circuits are omitted from the drawings). The contact-fingers, which are disposed on either side of the connector-slot to bear on electrical contact pads formed on both faces along the lower end of the board 13, extend downwardly through the base plate 12 to interconnect with a printed circuit on the lower face 12b of the plate 12. It is by means of this printed circuit that electrical interconnections of the boards 13 with one another and with external equipment (via a plug-and-socket connector of the casing) are established.

The printed-circuit boards 13 are inserted in the compartment into guideways 14 that are provided in alignment with the connectors 10 on the walls 11. The guideways 14 are defined between closely-spaced metal blocks 15 which project inwardly of the compartment from the flat surface 16 of each wall 11, and which serve to locate the boards 13 upright and apart from one another. The boards 13 are clamped at their sides in the guideways 14 using bushes 17 that are moulded of synthetic rubber. The bushes 17 occupy open-topped recesses 18 in the blocks 15 within the guideways 14, and each is retained in its recess 18 by a screw 19. The screw 19 extends down through the body of the bush 17 and screws into a threaded hole 20 that passes through the block 15 at the bottom of the recess 18. Metal washers 21 shaped to fit snugly into the open tops of the recesses 18 in the blocks 15 are provided beneath the heads of the screws 19 to bear on the bushes 17.

Screwing down of the screws 19 into the holes 20 compresses the bushes 17 under the washers 21 so that the bushes 17 deform outwardly into the guideways 14 to bear on the printed-circuit boards 13. Tightening of the screw 19 in any block 15 causes the bush 17 in that block 15 to be squeezed by compression hard against the margin of the associated printed-circuit board 13. The board 13 is in this way clamped against the flat surface of the other block 15 facing from across the guideway 14; where the block 15 is the last of the series on the wall 11, the flat surface in this case facing the block 15 across the guideway 14 and acting as the abutment for the board 13, is provided by a projecting metal flange 22 at the end of the wall 11.

Each board 13 is therefore clamped directly on to a well-defined and easily-machined flat surface that can be accurately located in relation to the walls 11 to enable a high packing-density of the boards 13 to be achieved within the compartment, and at the same time contribute substantially to the overall rigidity of the casing. Furthermore, the boards 13 are in each case clamped directly on to a metal surface and this enables good thermally-conductive paths to be achieved from the boards 13 into the walls 11, for cooling purposes.

The blocks 15 and flanges 22 of the walls 11 are preferably formed (by machining or casting) integrally with the remainder of the wall-body so as to enhance both the accuracy of location and the thermal conductivity applicable. If separately-formed blocks 15 were to be used then it would be necessary to provide a somewhat larger nominal spacing between the boards 13, so as to allow for possible positioning errors of these on the walls 11. Additionally, the thermal conductivity would be reduced.

The clamping pressure applied to any printed-circuit board 13 may be relaxed to enable removal of that board 13 from the casing, simply by loosening the screw 19. A spring retaining-clip 23 is provided on the threaded end of each screw 19 where this projects from the bottom of the hole 20, so as to restrict the extent to which the screw 19 can be unscrewed.

A slotted bar 24 is provided to extend along the length of each printed-circuit board 13 between the walls 11. The upper end of the board 13 is in each case entered into the slot of the bar 24, and the bar 24 is then secured firmly at both of its ends to the two walls 11. This additional restraint on the boards 13 serves to avoid flexing that might otherwise occur above the clamping at the blocks 15.

Figure 3:
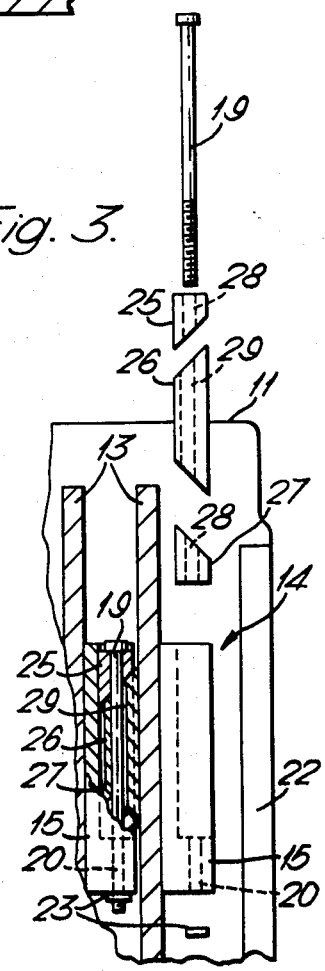
FIG. 3 is a fragmentary sectional end-view of a modified form of the mounting arrangement of FIGS. 1 and 2.

The form of mounting arrangement used in the equipment described above with reference to FIGS. 1 and 2, may be modified to avoid the use of the rubber bushes 17, as illustrated in FIG. 3.

Referring to FIG. 3, the bushes 17 are each replaced by a set of three metal wedge-elements 25 to 27. The three elements 25 to 27 of each set are located end to end on the screw 19 in the relevant recess 18. The bore 28 for the screw 19 through both the top and bottom single-wedge elements 25 and 27 is of a diameter to provide just a clearance fit with the screw 19, whereas the bore 29 through the central, double-wedge element 26 is of substantially larger diameter.

Tightening of the screw 19 urges firm abutment of the inclined (at 45°) ends of the two single-wedge elements 25 and 27 with the two inclined (also at 45°) ends respectively, of the double-wedge element 26. This tends to squeeze the element 26 outwardly into the guideway 14 from between the elements 25 and 27. The large diameter of the bore 29 permits a small degree of outward movement of the element 26 to take place, and the movement in this respect is sufficient to bring the element 26 to bear on the margin of the board 13 within the guideway 14 and establish the required clamping pressure on it.

We claim:

1. A mounting arrangement comprising two members for mounting one upon the other, two parts carried by a first of said members, the two said parts having elongated edges respectively which are disposed in spaced substantially parallel relationship to one another on said first member to define an elongated guideway therebetween for receiving a portion of the second member, one of said parts including clamping means for exerting a clamping force transversely of said elongated guideway to clamp said portion of said second member in the guideway against the other said part, said clamping means comprising an elongated displaceable element carried by said one part and extending lengthwise of said guideway, and means for applying compression to one end of said element in a direction lengthwise of said guideway to squeeze said element and cause it to project transversely into said guideway and thereby exert said transverse clamping force along a line parallel to said elongated edge of the other said part.

2. A mounting arrangement according to claim 1 wherein said element is an element of resilient material and the compression-applying means is operative to squeeze said element to project into said guideway by deformation of said element.

3. A mounting arrangement according to claim 2 wherein said one part includes a body having an elongate recess therein extending lengthwise of said guideway, and wherein said resilient element is a bush fitting into said recess.

4. A mounting arrangement according to claim 3 wherein said compression-applying means includes a screw extending through said bush within and lengthwise of said recess to screw into the said body.

5. A mounting arrangement according to claim 1 wherein said one part includes an inclined shoulder, and wherein said element is a wedge-shaped element having at least one inclined face positioned to bear on said shoulder, the compression-applying means including means for applying force to said wedge-shaped element to urge said inclined face against said shoulder and thereby squeeze said wedge-shaped element to cause it to project into said guideway.

6. A mounting arrangement according to claim 5 wherein said one part includes a body having a recess therein extending lengthwise of said guideway to receive said wedge-shaped element, and wherein said compression-applying means includes a screw extending through said wedge-shaped element within said recess to screw into the said one part.

7. A mounting arrangement according to claim 1 wherein said parts are formed integrally with said first member.

8. A mounting arrangement for printed-circuit boards, comprising a structure having a pair of opposed walls spaced from one another to define therebetween a compartment for receiving said boards, each of said walls carrying a series of mutually-spaced parts to define between successive ones of said parts a set of elongated guideways for receiving marginal portions of respective ones of said boards inserted into said compartment, the guideways of each set being aligned with individual ones of the guideways of the other set whereby each inserted board is received in guideways of the two walls, and a plurality of clamping means carried by said parts and each operable selectively to exert force transversely of a respective one of said guideways for clamping the marginal portion of a said board inserted in that guideway, each said clamping means comprising an elongated, displaceable clamping element extending in a direction substantially parallel to its associated guideway, and means for applying compression to one end of each said clamping element to squeeze said element and cause it to project into the said associated guideway and thereby exert said transverse clamping force along a line therein.

9. A mounting arrangement according to claim 8 wherein each said clamping element is an element of resilient material.

10. A mounting arrangement according to claim 8 wherein each said clamping element is a wedge element.

* * * * *